United States Patent
Baraszu et al.

(10) Patent No.: US 6,853,892 B2
(45) Date of Patent: Feb. 8, 2005

(54) STRATEGY TO CONTROL A CLUTCH TO CONNECT AN ENGINE TO A POWERTRAIN OF A HYBRID ELECTRIC VEHICLE

(75) Inventors: Robert Charles Baraszu, Dearborn, MI (US); Susan Rebecca Cikanek, Wixom, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 129 days.

(21) Appl. No.: 10/065,008

(22) Filed: Sep. 9, 2002

(65) Prior Publication Data

US 2004/0045750 A1 Mar. 11, 2004

(51) Int. Cl.[7] .............................................. B60K 6/02
(52) U.S. Cl. ........................ 701/22; 701/1; 180/65.2; 192/12 R
(58) Field of Search ...................... 701/22, 1; 180/65.2; 74/335, 661; 477/5, 6, 79; 475/5; 192/12 R, 30 R, 40, 48.7

(56) References Cited

U.S. PATENT DOCUMENTS

| | | | |
|---|---|---|---|
| 5,193,634 A | 3/1993 | Masut | 180/65.2 |
| 5,343,970 A | 9/1994 | Severinsky | 180/65.2 |
| 5,713,425 A | 2/1998 | Buschhaus et al. | 180/65.2 |
| 5,875,691 A | 3/1999 | Hata et al. | 74/661 |
| 5,943,918 A | 8/1999 | Reed, Jr. et al. | 74/661 |
| 5,979,257 A | 11/1999 | Lawrie | 74/335 |
| 6,110,066 A * | 8/2000 | Nedungadi et al. | 475/5 |
| 6,232,733 B1 | 5/2001 | Obayashi et al. | 318/432 |
| 6,269,290 B1 | 7/2001 | Egami et al. | 701/22 |
| 6,364,807 B1 * | 4/2002 | Koneda et al. | 477/5 |
| 6,533,701 B2 * | 3/2003 | Maruyama | 477/5 |
| 6,558,290 B2 * | 5/2003 | Phillips et al. | 477/5 |

* cited by examiner

Primary Examiner—Tan Q. Nguyen (57) ABSTRACT

This invention is a control system for a clutch for connecting an engine to the powertrain of an HEV. The system includes a controller programmed to determine a filtered speed error of the engine and a starter/motor and to determine an engine run command. Monitoring devices operatively connected to the engine and the starter/motor are connected to output data representing the engine and starter/motor speeds to the controller. The controller is programmed to generate a clutch position command, dependent on the data, to a servo-actuator connected to the clutch. The invention, further, provides methods for controlling such a clutch including the steps of determining an engine run command, determining a filtered speed error of the engine and a starter/motor and generating a clutch position command.

11 Claims, 8 Drawing Sheets

STRATEGY TO CONTROL A CLUTCH TO CONNECT AN ENGINE TO A POWERTRAIN OF A HYBRID ELECTRIC VEHICLE

FIELD OF INVENTION

The present invention relates generally to a hybrid electric vehicle (HEV), and specifically to a strategy to control engaging and disengaging a clutch used to connect an engine to the powertrain of an HEV.

BACKGROUND OF INVENTION

The need to reduce fossil fuel consumption and emissions in automobiles and other vehicles predominately powered by internal combustion engines (ICEs) is well known. Vehicles powered by electric motors attempt to address these needs. Another alternative solution is to combine a smaller ICE with electric motors into one vehicle. Such vehicles combine the advantages of an ICE vehicle and an electric vehicle and are typically called hybrid electric vehicles (HEVs). See generally, U.S. Pat. No. 5,343,970 to Severinsky.

The HEV is described in a variety of configurations. Many HEV patents disclose systems where an operator is required to select between electric and internal combustion operation. In other configurations, the electric motor drives one set of wheels and the ICE drives a different set.

Other, more useful, configurations have developed. For example, a series hybrid electric vehicle (SHEV) configuration is a vehicle with an engine (most typically an ICE) connected to an electric motor called a generator. The generator, in turn, provides electricity to a battery and another motor, called a traction motor. In the SHEV, the traction motor is the sole source of wheel torque. There is no mechanical connection between the engine and the drive wheels. A parallel hybrid electrical vehicle (PHEV) configuration has an engine (most typically an ICE) and an electric motor that work together in varying degrees to provide the necessary wheel torque to drive the vehicle. Additionally, in the PHEV configuration, the motor can be used as a generator to charge the battery from the power produced by the ICE.

A parallel/series hybrid electric vehicle (PSHEV) has characteristics of both PHEV and SHEV configurations and is sometimes referred to as a parallel/series "split" configuration. In one of several types of PSHEV configurations, the ICE is mechanically coupled to two electric motors in a planetary gear-set transaxle. A first electric motor, the generator, is connected to a sun gear. The ICE is connected to a carrier. A second electric motor, a traction motor, is connected to a ring (output) gear via additional gearing in a transaxle. Engine torque can power the generator to charge the battery. The generator can also contribute to the necessary wheel (output shaft) torque if the system has a one-way clutch. The traction motor is used to contribute wheel torque and to recover braking energy to charge the battery. In this configuration, the generator can selectively provide a reaction torque that may be used to control engine speed. In fact, the engine, generator motor and traction motor can provide a continuous variable transmission (CVT) effect. Further, the HEV presents an opportunity to better control engine idle speed over conventional vehicles by using the generator to control engine speed.

The desirability of combining an ICE with electric motors is clear. There is great potential for reducing vehicle fuel consumption and emissions with no appreciable loss of vehicle performance or driveability. The HEV allows the use of smaller engines, regenerative braking, electric boost, and even operating the vehicle with the engine shutdown. Nevertheless, new ways must be developed to optimize the HEV's potential benefits.

One such area of HEV development is controlling the engagement and disengagement of the engine from the HEV powertrain. Frequently, this is done using a two-way clutch in parallel HEV's. A two-way clutch allows the engine to drive the motor, and allows the engine and motor to drive the vehicle. Clutch control strategies for HEVs are known in the art. See generally, U.S. Pat. No. 5,979,257 to Lawrie and U.S. Pat. No. 5,943,918 to Reed, Jr. et al. Nevertheless, none are designed to control engaging and disengaging a two-way clutch to connect the engine from a parallel HEV.

SUMMARY OF INVENTION

Accordingly, an object of the present invention is to provide a strategy to control engaging and disengaging a clutch used to connect an engine to the powertrain of an hybrid electric vehicle (HEV).

Briefly, the invention provides a system for clutch control in an HEV. The system, which controls a clutch for connecting an engine to the powertrain of the HEV includes a controller programmed to determine a filtered speed error of the engine and a starter/motor and to determine an engine run command. Monitoring devices operatively connected to the engine and the starter/motor are connected to output data representing the engine and starter/motor speeds to the controller. The controller is programmed to generate a clutch position command, dependent on the data, to a servo-actuator connected to the clutch.

The invention, further, provides methods for controlling such a clutch including the steps of determining an engine run command, determining a filtered speed error of the engine and a starter/alternator (or starter/motor) and generating a clutch position command. The step of determining an engine run command may include the steps of determining whether the clutch is engaged, determining whether the engine is at least spinning at a predetermined idle speed, and commanding a fuel request to the engine when the clutch is engaged and the engine is spinning at least at the predetermined idle speed. The step of determining a filtered speed error may include the steps of determining a speed error, determining a scaled speed error; and inputting the scaled speed error to a digital lowpass filter.

Other features and advantages of the present invention will become more apparent to persons having ordinary skill in the art to which the present invention pertains from the following description taken in conjunction with the accompanying figures.

BRIEF DESCRIPTION OF DRAWINGS

The foregoing advantages and features, as well as other advantages and features will become apparent with reference to the description and figures below, in which like numerals represent like elements and in which.

DETAILED DESCRIPTION

The present invention relates to hybrid electric vehicles (HEVs) and, more particularly, a strategy to control engaging and disengaging a clutch used to connect an engine to the powertrain of an HEV. The preferred embodiment of the present invention uses a controller for engaging and disengaging a dry two-way clutch used for connecting an engine to a powertrain in a parallel hybrid electric vehicle (PHEV).

Figure 1:
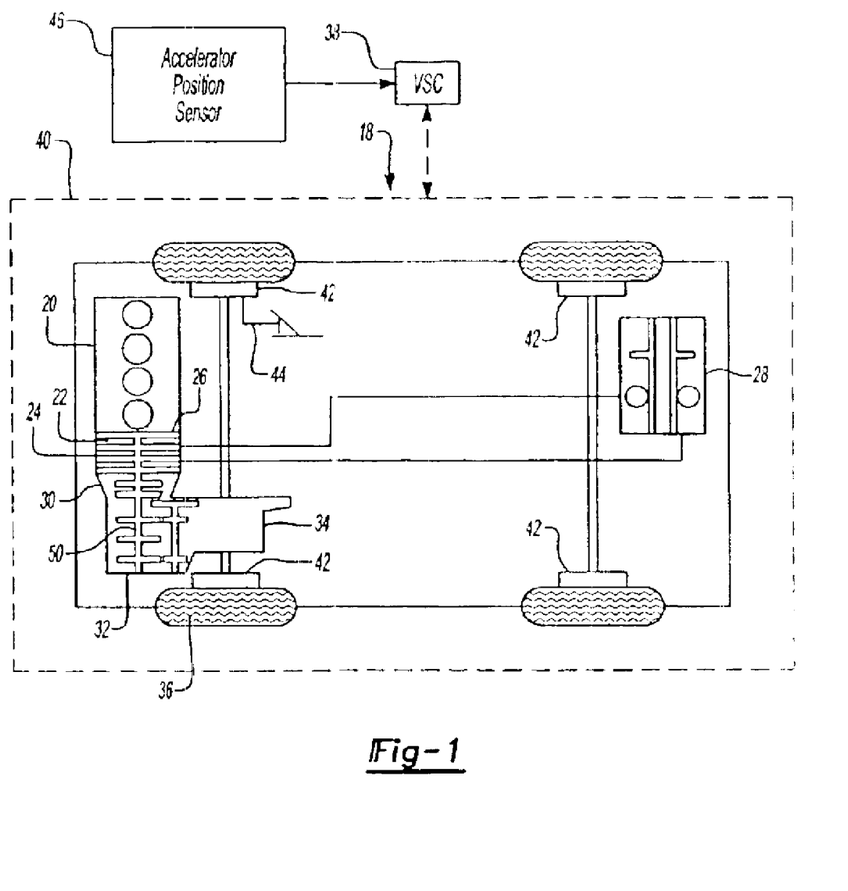
FIG. 1 illustrates a general parallel hybrid electric powertrain configuration.

FIG. 1 illustrates a possible PHEV powertrain to demonstrate the present invention and is generally indicated at 18. This powertrain 18 has an engine 20 (such as a conventional 2.0 L spark-ignited, internal combustion engine (ICE)) and a combination starter/motor 24 to supply motive torque for the vehicle. The starter/motor 24 is configured and sized to not only provide motive torque, but also to spin the engine 20 for starting purposes. For the present invention a 60 horse power (HP) starter/motor 24 can be used. The vehicle powertrain also has a disconnect clutch ("clutch") 22 positioned between the engine 20 and starter/motor 24. The clutch 22 can be a two-way dry disconnect clutch known in the art. The clutch 22 can be connected to the engine 20 on an engine flywheel and can connect to the starter/motor 24 on its rotor shaft 50. A servo-actuator 26 housed together with the clutch 22 can activate the clutch 22 to a closed and open position. The servo-actuator 26 can electronically control the engagement and disengagement of the clutch 22 by applying or releasing pressure on the friction components. These mechanisms are well known in the art.

The clutch 22 in a closed position allows the engine 20 to connect to the powertrain 18. This closed position can serve three HEV powertrain functions. First, it allows the engine 20 to spin the starter/motor 24 to generate power to charge and discharge a high-powered energy storage device such as a battery 28 (the battery 28 is electrically connected to the starter/motor 24). Second, it allows the starter/motor 24 to spin the engine 20 during engine 20 start-up. And third, it allows both the engine 20 and starter/motor 24 to drive the vehicle powertrain 18 simultaneously. In an open position, the engine 20 is disconnected from the vehicle powertrain 18. The clutch 22 would be open if the engine 20 is not running.

As illustrated in FIG. 1, the powertrain also has: a forward clutch 30 connected to the starter/motor 24; an electronically controlled converterless transmission (ECLT) 32 connected to the forward clutch 30; a differential and half-shafts combination ("differential") 34 connected to the ECLT 32; and at least one drive wheel 36 connected to the differential 34. Any of the vehicle wheels can be connected to a mechanical braking system 42 activated by operator using a brake activation means such as a brake pedal 44 well known in the art. Also, this powertrain is for illustrative purposes only. Several other powertrain configurations are possible using the present invention.

Each component of the illustrated powertrain 18 can have a sensor and an associated controller. A vehicle system controller (VSC) 38 can receive sensor input and control the components accordingly in this HEV configuration by connecting to each component's controller. Alternatively, controllers can be physically combined in any combination or can stand as separate units. The VSC 38 illustrated in FIG. 1 can communicate with the servo-actuator 26 and other components through a communication network such as a controller area network (CAN) 40. Sensor inputs can be included for the starter/motor 24 speed, engine 20 speed, clutch 22 position, and the position of driver operated braking means and accelerator means. The sensor for the accelerator means can be an accelerator position sensor 46.

The present invention is a strategy to control the servo-actuator 26 to open and close the clutch 22. This clutch controller as illustrated is within VSC 38. In this illustration, the controller can generate a position command (Clutch_Position_Cmd) to the servo-actuator 26 as an eight-bit integer that represents a scaled, fixed-point representation of the interval 0.0 to 1.0, divided into 256 equal steps of value $1/256$. The servo-actuator 26 can interpret the Clutch_Position_Cmd according to Table 1 below.

TABLE 1

| Condition | Clutch State |
| --- | --- |
| Clutch_Pos_Cmd > 0.85 | Disengaged |
| 0.15 < Clutch_Pos_Cmd < 0.85 | Slipping |
| Clutch_Pos_Cmd < 0.15 | Engaged |

For example, the VSC 38 can command only the starter/motor 24, to provide motive force to the powertrain 18. This command can include turning off the engine 20 and disconnecting the clutch 22. The clutch 22 can be completely disengaged by generating a Clutch_Position_Cmd>0.85. Any position value between 0.5 and 1.0 will result in activating the servo-actuator 26 to completely disengage the clutch 22. Similarly, if the VSC 38 commands the engine 20 to connect to the powertrain 18, the controller of the present invention can generate a Clutch_Position_Cmd<0.15. Any position value between 0 and 0.15 will result in activating the servo-actuator 26 to completely engage the clutch 22.

During clutch 22 transition from an engaged to disengaged state (and from disengaged to engaged) there is a period of decreasing (and increasing) clutch 22 engagement. This clutch 22 "slipping" state is a nonlinear relationship between the value of Clutch_Position_Cmd and the degree of clutch 22 engagement. For example, more slip is commanded as the eight-bit position value approaches 0.85 (i.e., less torque transmitted through the clutch 22). Similarly, less slip can be commanded as the position approaches 0.15 (i.e., more torque is transmitted through the clutch 22) and the closer the clutch is to being fully engaged.

The clutch 22 controller of the present invention controls clutch 22 slip during engagement and disengagement to provide a smooth transition, transparent to the driver in terms of noise, vibration and harshness (NVH) and performance feel. This smooth transition is important since an hybrid electric vehicle (HEV) can frequently transition between the various HEV operating modes such as: engine 20 only, starter/motor 24 only, engine 20 with starter/motor 24 boost, charging, and regenerative braking.

The present invention is a disconnect clutch control (Disconnect_Clutch_Control) and can have a top level structure of three main strategies: (1) Determ_Engine_Run_Cmd, (2) Determ_Filtered_Speed_Error, and (3) Generate_Clutch_Position_Cmd.

(1) Determ_Engine_Run_Cmd

One of the two outputs of the Disconnect_Clutch_Control can be an engine run command (Engine_Run_Cmd), where engine fueling is commanded to start (=1) or stop (=0). The other output is a Clutch_Position_Cmd. The Engine_Run_Cmd is a modified version of a VSC 38 signal Fuel_Engine_Request and can be set high whenever the engine 20 needs to be turned on to provide motive power or charge the battery 28. Traditionally, once the VSC 38 determines the engine 20 needs to be started, it sets Fuel_Engine_Request high (=1) to commence engine 20 fueling. Nevertheless, if the clutch 22 is not yet engaged and the engine 20 is not rotating at sufficient speed, fueling must be prohibited. Therefore, the Determ_Engine_Run_Cmd delays the engine 20 fueling until the starter/motor 24 in combination with clutch 22 engagement has brought the engine 20 up to or beyond its "idle speed," which in this embodiment can be 750 rpm. Only then is Fuel_Engine_Cmdset high and engine 20 fueling begins (See steps 82, 86, 90 and 92).

Figure 3:
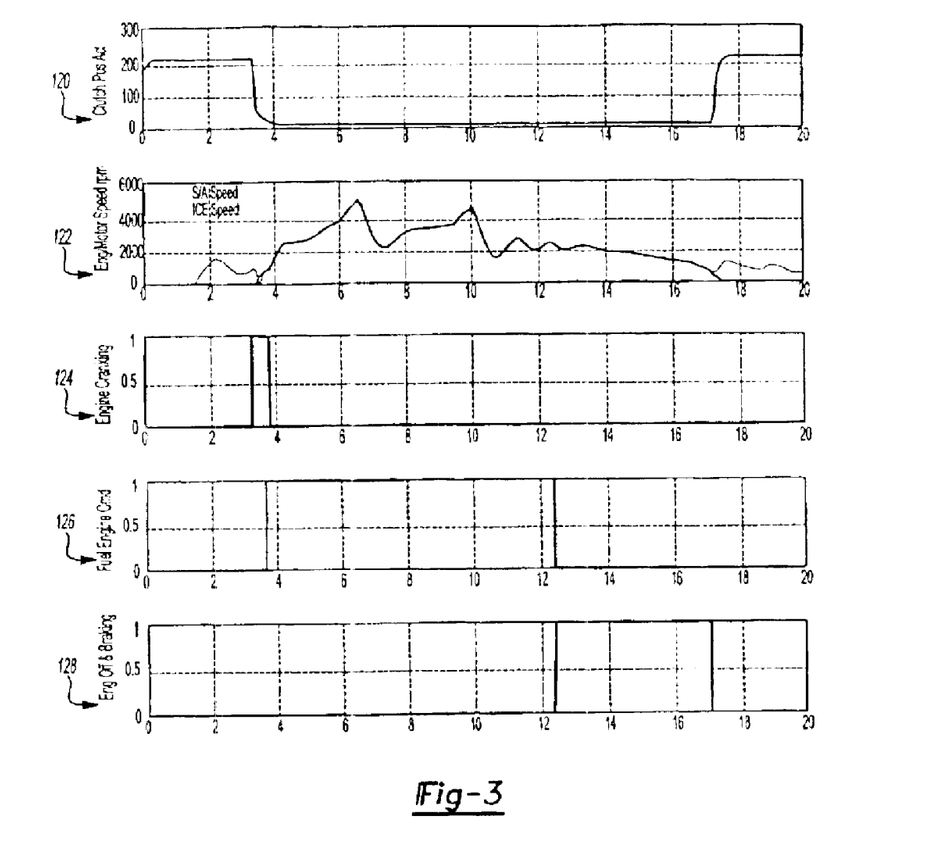
FIG. 3 illustrates a 20 second simulation of the present invention.

A sample code representation of the above description and the contents of FIG. 3, Determ_Engine_Run_Cmd, is: IF (Clutch_Pos_Actual<0.85) AND (Eng_Spd_GT_750=1) AND (Fuel_Engine_Request=1), THEN (Engine_Run_Cmd=1) ELSE (Engine_Run_Cmd=0) END.

Here:

Clutch_Pos_Actual<0.85: Clutch is slipping.

Eng_Spd_GT_750=1: Engine speed is greater than 750 rpm.

Fuel_Engine_Request=1: The VSC has decided that the ICE needs to be running.

Engine_Run_Cmd=1: Begin fueling the ICE.

Engine_Run_Cmd=0: Do not fuel the ICE.

(2) Determ_Filtered_Speed_Error

This procedure determines the Speed_Error (rpm) between the starter/motor 24 speed and the engine 20 speed as a measure of clutch 22 slip (step 72 below). A very small gain multiplies the speed error to scale it to a range of approximately ±1 for use in the remainder of the strategy. This Scaled_Speed_Error (see step 70 below) can be the input to a Digital_Lowpass_Filter. This filter, which is a standard digital filter known in the art, can be determined by the following difference equation (see step 72):

Filtered_Speed_Error (k)=TIME_CONSTANT*Scaled_Speed_Error(k)+(1−TIME_CONSTANT)*Filtered_Speed_Error (k−1)

The value "k" refers to the current determination time step and "k−1" the determination from the previous time step. TIME_CONSTANT is a number between 0.0 and 1.0. The closer it is to 0.0, the more heavily filtered, or smoothed, the output Filtered_Speed_Error (k) will be; conversely, the closer it is to 1.0, the less filtered it will be. Also, the heavier the filtering, the slower the clutch 22 will be allowed to be engaged; consequently, the choice of TIME_CONSTANT is the key to proper tuning of the strategy. In one embodiment the constant can be TIME_CONSTANT=0.03. Here, very heavy filtering is performed to feather the clutch 22 engagement, ensuring a seamless, imperceptible transition from one HEV driving mode to the next.

(3) Generate_Clutch_Positon_Cmd

The primary output of Disconnect_Clutch_Control of the present invention is the Clutch_Pos_Cmd, (see steps 78, 92, and 99 below). This command can be sent over the CAN 40 to the clutch servo-actuator 26 to position the clutch 22 plates according to the command. The servo-actuator 26 has a sensor to determine the actual clutch 22 position, Clutch_Position_Actual, and sends it back to the VSC 38 to the Disconnect_Clutch_Control strategy where it is used to determine Determ_Engine_Run_Cmd as previously described. The Generate_Clutch_Position_Cmd contains Switching_Logic_Subsystem to determine Eng_Spd_GT_750 (Engine Speed>750 rpm) and sends it to Determ_Engine_Run_Cmd, and Engine_Off_and_Brk. Braking_Logic, determined in another VSC 38 procedure (see step 62 below), is high (=1) when the braking device such as a brake pedal 44 is applied or if the accelerator pedal position sensor 46 detects the accelerator is NOT applied, for instance, during braking or coasting. Braking_Logic is low (=0) when the accelerator pedal is applied. Switching_Logic_Subsystem logically ANDs Braking_Logic with Eng_Spd_GT_750 to produce Engine_Off_and_Brk. For example, with the mechanical brake applied (or, neither brake and accelerator pedal are not applied) and the engine 20 speed is greater than 750 rpm, this signal is high (=1), setting Clutch_Position_Cmd=1.0 to engage the clutch 22 fully. If the accelerator is applied, e.g., the operator's foot is on the accelerator pedal, Engine_Off_and_Brk=0 and the switch will pass through the lower signal whose determination is described next.

There can be several ways to determine engagement and disengagement of the clutch 22. Simply, if Crank_Engine_Cmd=1 or if Fuel_Engine_Request=1 (in other words, if the VSC 38 has decided to crank the engine 20 or, it is already cranked and is ready to be fueled) then Filtered_Speed_Error is passed through the switch and subtracted from 1 (the output of Crank_Engine_Cmd OR Fuel_Engine_Request). This operation is why it is necessary to scale Speed_Error to Scaled_Speed_Error in Determ_Filtered_Speed_Error. The scaling factor is chosen so that when the clutch 22 is asked to engage, Filtered_Speed_Error is at some value near 0.5.

Figure 2:
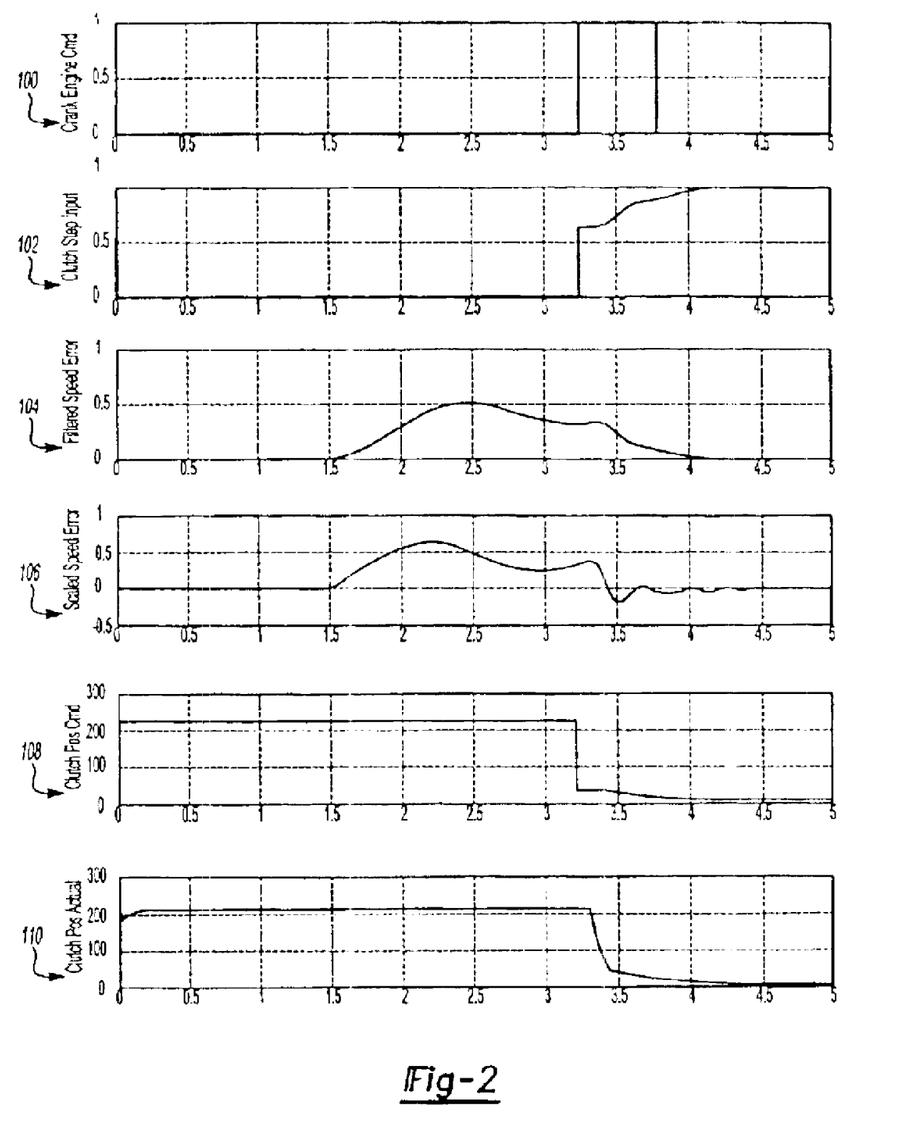
FIG. 2 illustrates a clutch control operation logic of the present invention.

FIG. 2 can illustrate one embodiment the present invention Generate_Clutch_Positon_Cmd logic. FIG. 2 shows several variables as a function of time (5 seconds) including: $\text{Crank}_{Engine}$_Cmd 100, Clutch_Step_Input 102, Filtered_Speed_Error 104, Scaled_Speed_Error 106, Clutch_Position_Cmd 108, and Clutch_Pos_Actual 110. In the example of FIG. 2, the Filtered_Speed_Error 102 value is roughly 0.4 when Crank_Engine_Cmd goes high. Clutch_Step_Input 102=1−Filtered_Speed_Error 104 is then around 0.6 resulting in Clutch_Positon_Cmd 108= approximately 40 after passing through the linear interpolation table Clutch_Pos_Map (Table 2, and step 99 below).

TABLE 2

Clutch_Pos_Map

| Clutch_Step_Input | Clutch State |
| --- | --- |
| −1.0 | Disengaged |
| −0.5 | Disengaged |
| 0 | Disengaged |
| 0.5 | Slipping |
| 1.0 | Engaged |

This Clutch_Position_Cmd is sent to the clutch's servo-actuator 26 that compresses the clutch 22 plates to achieve this commanded position. The bottom trace of FIG. 2 shows the Clutch_Pos_Actual from the sensor output of the clutch position sensor. The mechanical dynamics of the clutch mechanism produce the filtering effect between the control signal, Clutch_Position_Cmd, and the physically measured Clutch_Pos_Actual.

The effect of Digital_Lowpass Filter described above is evident in FIG. 2, Filtered_Speed_Error 104 and Scaled_Speed_Error 106. If the value of TIME_CONSTANT described above was not sufficiently small to provide enough smoothing, Filtered_Speed_Error 104 would tend to be more like Scaled_Speed_Error 106 (which was filtered to obtain Filtered_Speed_Error 104) resulting in very oscillatory engagement and disengagement processes and, therefore, unsatisfactory performance.

Figure 4:
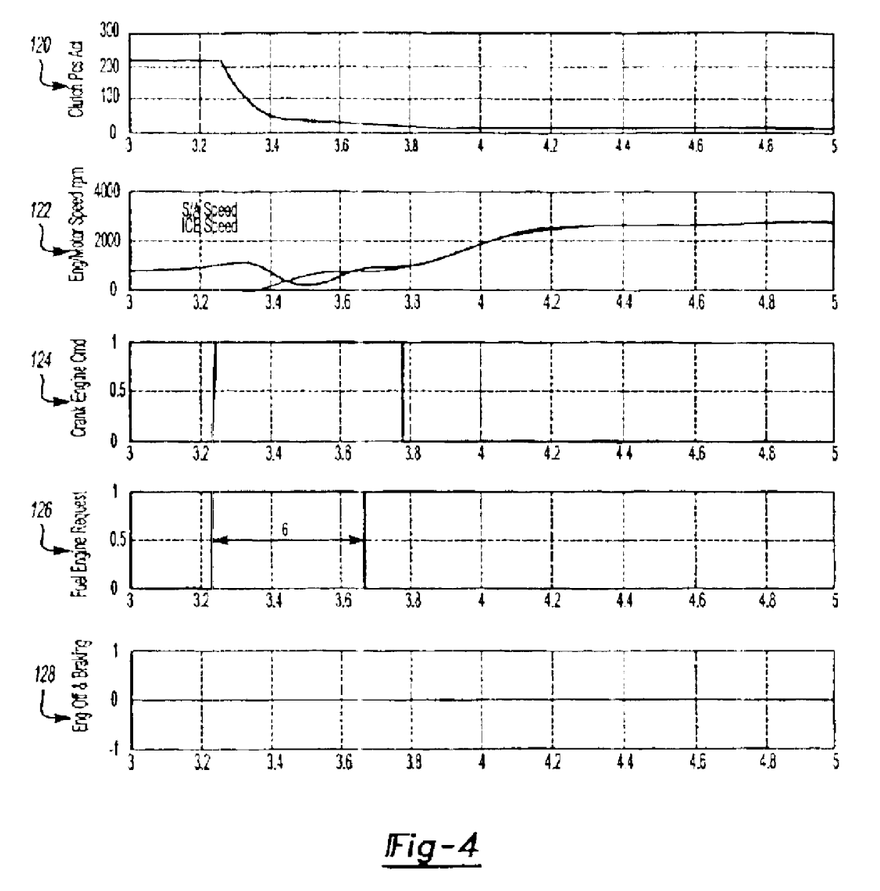
FIG. 4 illustrates an expanded view of the 3 to 5 second period of the FIG. 3 simulation.
Figure 5:
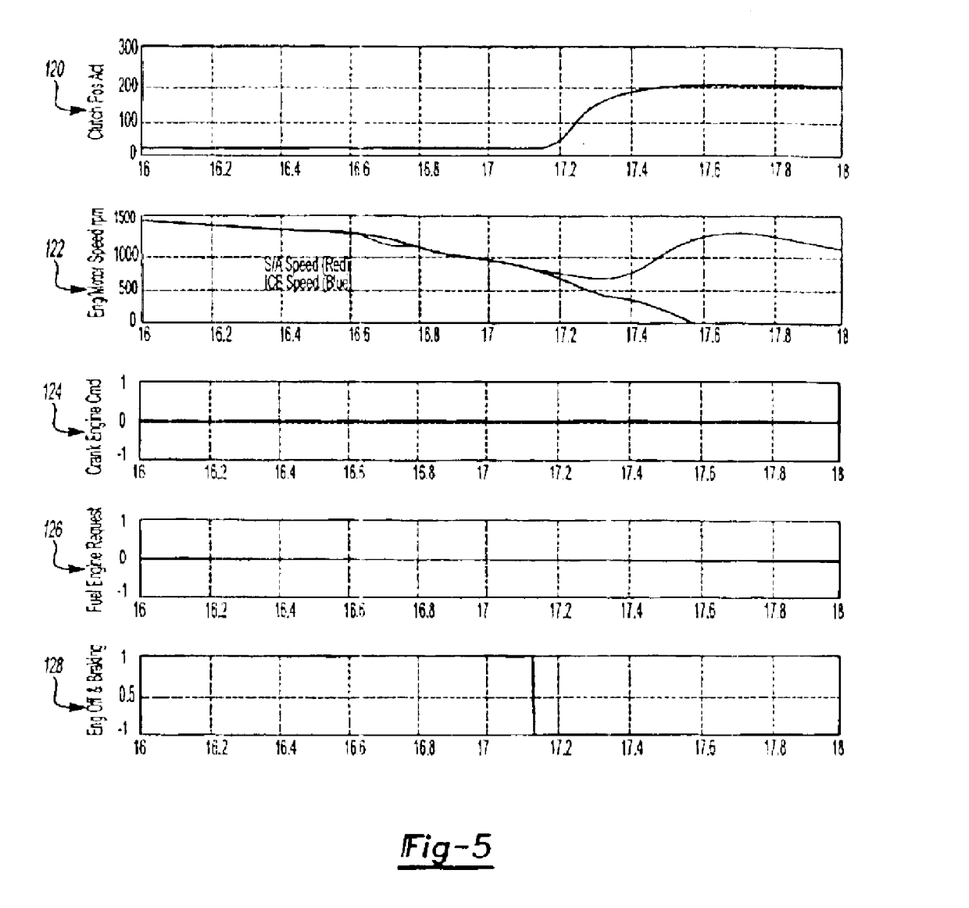
FIG. 5 illustrates an expanded view of the 16 to 18 second period of the FIG. 3 simulation.

FIG. 3 shows a 20 second simulation of one embodiment of the present invention including: Clutch_Pos_Actual 120, Eng/Motor Speed rpm 122, Eng_Cranking 124, Engine_Run_Cmd 126, and Eng_Off & Braking 128. FIG. 3 shows that the clutch 22 begins to engage when the engine 20 begins cranking. FIG. 3 also shows a 3 to 5 second clutch 22 engagement period. The clutch 22 goes through a short period of slipping until the engine 20 speed equals the starter/motor 24 speed. The clutch 22 is then fully engaged while the vehicle operator speeds away until just after 12 seconds. Just after 12 seconds, the vehicle operator releases the accelerator pedal and either begins braking or is coasting with neither brake nor accelerator depressed. The clutch 22 stays engaged through this coast down period and disengages just before the 18 second mark when the engine 20 speed has dropped below 750 rpm. FIG. 4 expands the engagement phase of FIG. 3 (3 to 5 seconds) and FIG. 5 expands the disengagement phase of FIG. 3 (16 to 18 seconds).

Figure 6A:
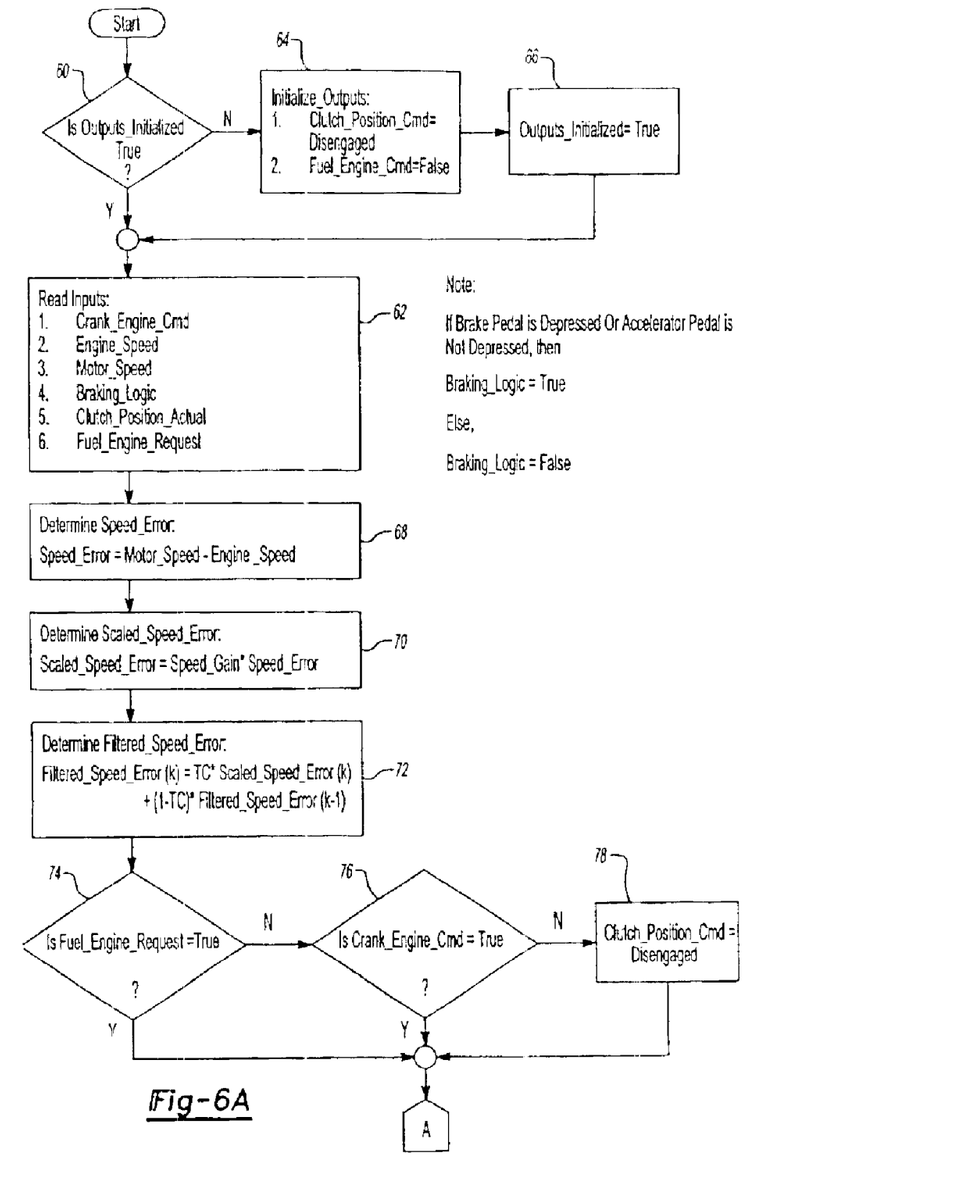
FIGS. 6A–C illustrates a control strategy using the present invention.
Figure 6B:
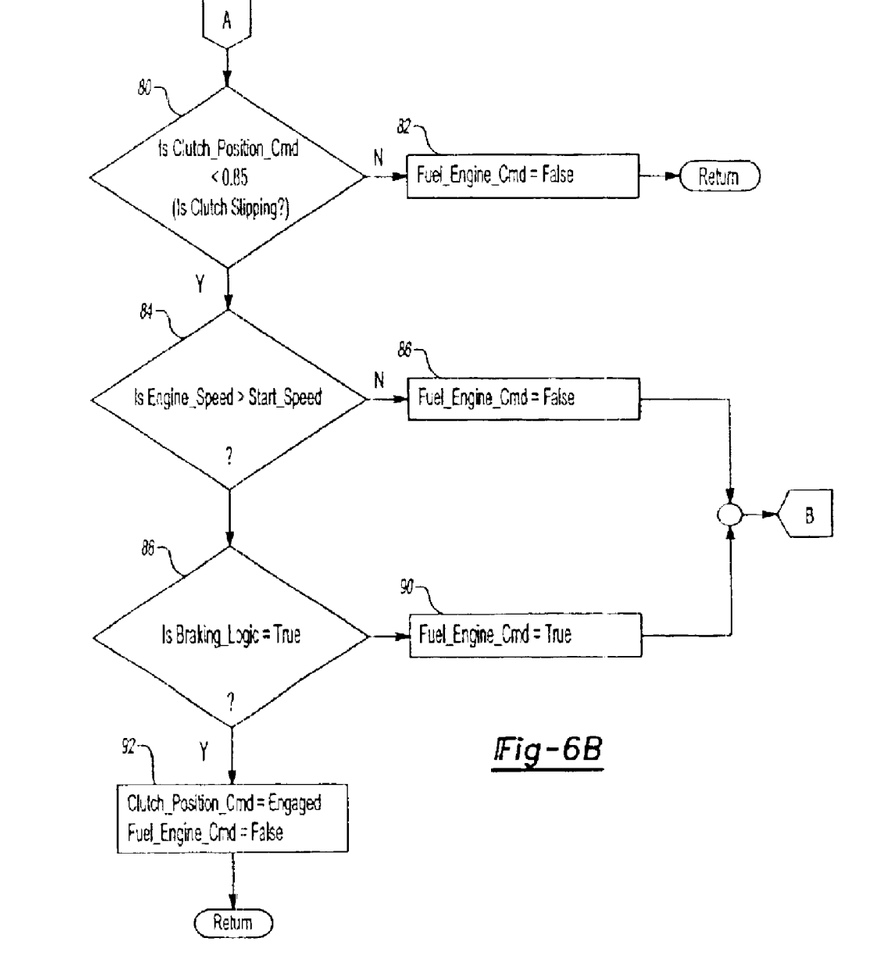
Figure 6C:
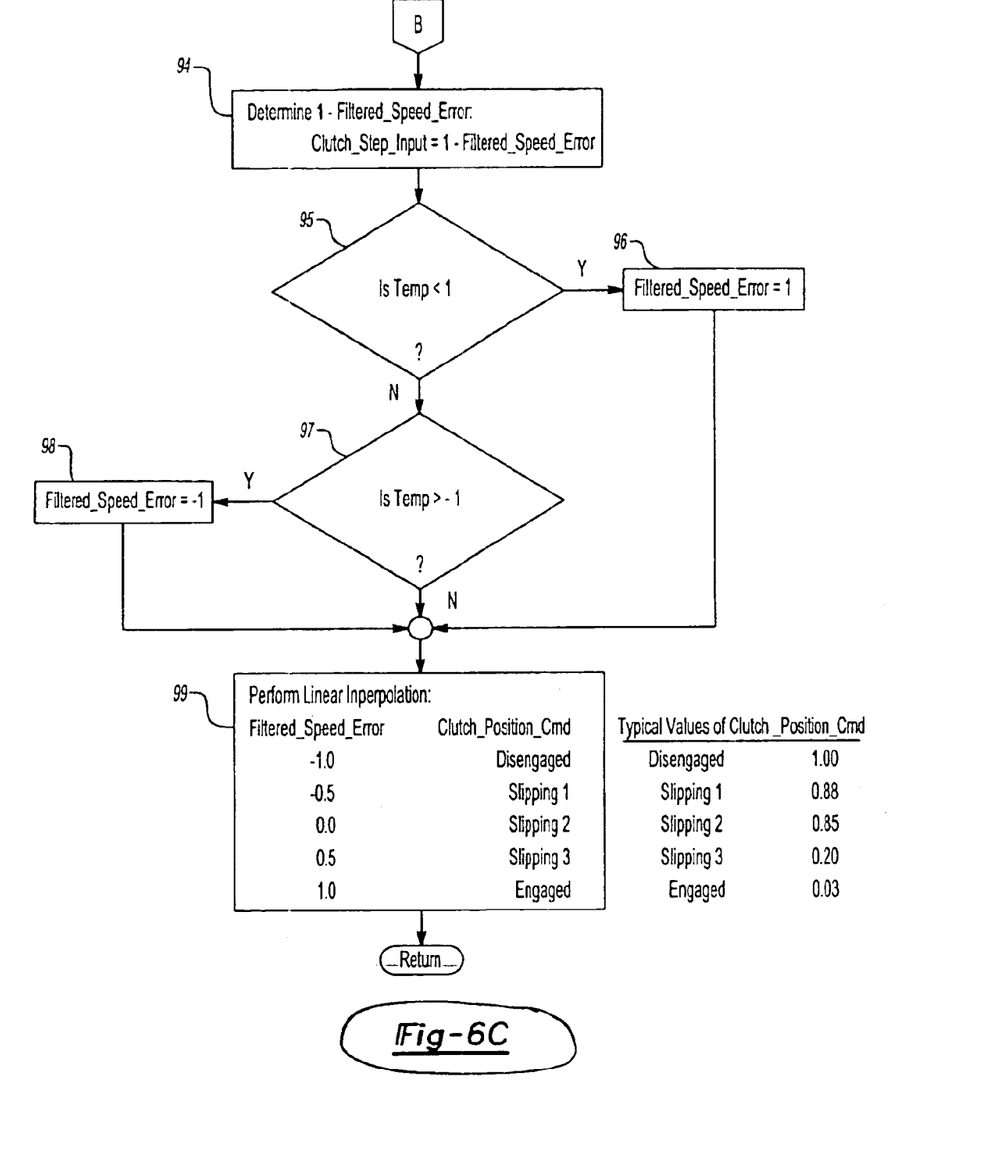

The possible control strategy for the controller of the present invention is illustrated in FIGS. 6A–6C. It can be housed within the VSC 38. Many other control strategies using the present invention are possible. This strategy can start and end with each drive cycle (i.e., between "key-on" and "key-off"). In FIGS. 6A–6C, the illustrated embodiment starts at Step 60 and determines whether the vehicle controller outputs have been initialized (Outputs_Initialized). Here, the outputs need to be initialized, given a known value, the first time through the algorithm after startup to ensure that the outputs are not set to an unwanted state by the power-up sequence of the controller. If yes, the strategy proceeds to step 62. If no, the strategy proceeds to step 64 and commands "Initialize_Outputs" including: Clutch_Position_Cmd=Disengaged and Fuel_Engine_Cmd=False. The strategy proceeds next to step 66 and commands Outputs_Initialized=True and proceeds to step 62. Once initialized in the first pass through the algorithm, subsequent output values are determined by the algorithm. As described above, the Clutch_Position_Cmd, for this step could be an eight-bit integer>0.85.

At step 62 the strategy is commanded to read various vehicle inputs such as other VSC 38 commands and inputs various vehicle sensor outputs. In the illustration presented in FIGS. 6A–C, the following examples are included: Crank_Engine_Cmd, Engine_Speed, Motor_Speed, Braking_Logic, Clutch_Position_Actual, Fuel_Engine Request. These examples represent various inputs that would be necessary to smoothly transition a clutch 22 between engaged and disengaged states. Crank_Engine_Cmd alerts the strategy whether the engine 20 has been commanded by the VSC 38 to start. Engine_Speed can originate from an engine 20 speed sensor well known in the art. Similarly, Motor_Speed can originate from a starter/motor 24 speed sensor known in the art. The difference in Engine_Speed and Motor_Speed can be used to determine actual clutch 22 slippage (see below). If a mechanical braking means such as a brake pedal 44 is depressed and a vehicle accelerator means such as an accelerator pedal is NOT depressed, then Braking_Logic=True. Otherwise, Braking_Logic=False. Accelerator pedal position is detected by the accelerator position sensor 46. The Clutch_Position_Actual is the actual position of the clutch 22 in terms of engagement and disengagement sensed by a clutch 22 position sensor. The Fuel_Engine_Request is a VSC 38 command the controller of the present invention can use to indicate whether the engine 20 is running.

Once the inputs are read in step 62, the strategy next proceeds to step 68 and determines Speed_Error. Speed_Error is the difference between the starter/motor 24 speed and engine 20 speed.

Next, the strategy proceeds to step 70 to determine Scaled_Speed_Error. The Scaled_Speed_Error multiples the Speed_Error determined in step 68 by Speed_Gain as described above.

Next the strategy proceeds to step 72 to determined Filtered_Speed_Error. The Filtered_Speed_Error as described above is:

(Time Constant) Scaled_Speed_Error)(k)+(1 Time Constant)*Filtered_Speed_Error) (k 1)

Next, the strategy proceeds to step 74 and determines whether the VSC 38 has requested fuel to the engine 20. If yes, the strategy proceeds to step 80. If no, the strategy proceeds to step 76 and determines whether the VSC 38 has commanded the Crank_Engine_Cmd. If yes, the strategy proceeds to step 80. If no, the strategy proceeds to step 78 and commands the clutch to disengage (i.e., Clutch_Position_Cmd=Disengaged), then proceeds to step 80.

At step 80, the strategy determines whether the Clutch_Position_Cmd is commanding the clutch 22 to slip. If no, the Fuel_Engine_Cmd is commanded false at step 82 and the strategy returns to the beginning. If yes, the strategy proceeds to step 84 and determines if the engine speed is greater than a predetermined start speed (as suggested above, a start speed could be under 750 RPM). If no at step 84, the strategy commands the Fuel_Engine_Cmd=False and proceeds to step 94.

If yes at step 84, the strategy determines if the Braking_Logic=true (as described above) at step 88. If no, the strategy proceeds to step 90 and commands Fuel_Engine_Cmd=True, then proceeds to step 94.

If yes at step 88, the strategy commands the clutch 22 to engage (Clutch_Positon_Cmd=Engaged) and the stop fuel to the engine 20 (Fuel_Engine_Cmd=False). The strategy next returns to the beginning.

At step 94, the strategy determines Clutch_Step_Input as a value (Temp) of 1 the Filtered_Speed_Error (from step 72) and proceeds to step 95. At step 95, the strategy determines whether "Temp" from step 94 is less than 1. If yes, the strategy proceeds to step 96 and sets the Filtered_Speed_Error to 1 in step 96 and proceeds to step 99.

If no at step 95, the strategy proceeds to step 97 and determines whether "Temp" is >−1. If no, the strategy proceeds to step 99. If yes, the strategy proceeds to step 98 and sets the Filtered_Speed_Error to 1, then proceeds to step 99.

At step 99, the procedure performs a linear interpolation to smoothly transition the engagement of the clutch 22.

To summarize, step 96 and step 98 are used to limit Temp to +1 or 1 if the calculation in 94 results in a value of Temp greater than +1 or less than 1. When Temp is between 1 and 1, the algorithm will proceed from step 94 to step 95 to step 97 and to step 99. Command values can have only positive values between 0 and 1, whereas Clutch_Step_Input takes on values between 1 and 1.

The above-described embodiments of the invention are provided purely for purposes of example. Many other variations, modifications, and applications of the invention may be made.

What is claimed is:

1. A method to control a clutch to connect an engine to a powertrain of a hybrid electric vehicle (HEV), comprising the steps of:
   determining an engine run command;
   determining a filtered speed error of the engine and a starter/motor; and
   generating a clutch position command.

2. The method of claim 1, wherein the HEV is a parallel HEV.

3. The method of claim 1, wherein the step of determining an engine run command comprises the steps of:
   determining whether the clutch is engaged;
   determining whether the engine is at least spinning at a predetermined idle speed;
   commanding a fuel request to the engine when the clutch is engaged and the engine is spinning at least at the predetermined idle speed.

4. The method of claim 3 wherein the predetermined idle speed is 750 RPM.

5. The method of claim 1, wherein the step of determining a filtered speed error comprises the steps of:
   determining a speed error;
   determining a scaled speed error; and
   inputting the scaled speed error to a digital lowpass filter.

6. The method of claim 5, wherein determining speed error comprises the steps of:
   sensing starter/motor speed and engine speed; and
   determining the difference of the starter/alternator speed and the engine speed.

7. The method of claim 5, wherein the step of determining scaled speed error comprises the steps of:
   determining a speed gain; and
   multiplying the speed gain and the speed error.

8. The method of claim 5, wherein the step of determining filtered speed error comprises the steps of:
   multiplying the scaled speed error by a predetermined time constant (TC) and a current determination time step (K);
   multiplying (1−TC) by the filtered speed error and (k−1); and
   summing the step multiplying the scaled speed error by TC and a current determination time step (K) and the step of multiplying (1−TC) by the filtered speed error and (k−1).

9. The method of claim 8, wherein the predetermined time constant is 0.03.

10. The method of claim 1, wherein the step of generating a clutch position command comprises the steps of:
    sensing actual clutch position, whether an accelerator is applied, and whether a mechanical braking device is applied;
    inputting actual clutch position to a vehicle system controller;
    determining whether engine speed is greater than a predetermined idle speed;
    commanding engagement of the clutch when the braking device is applied and the engine speed is greater than a predetermined idle speed; and
    commanding engagement of the clutch when both the braking device and the accelerator are applied and the engine speed is greater than a predetermined idle speed.

11. The method of claim 10, wherein the predetermined idle speed is 750 RPM.

* * * * *